United States Patent Office 2,926,148
Patented Feb. 23, 1960

2,926,148
RESIN DRYING CATALYSIS

Rene Leclercq, Woluwe-Saint-Pierre, and René Paquet, Braine-le-Comte, Belgium, assignors to Union Chimique Belge S.A., Brussels, Belgium, a corporation of Belgium No Drawing. Application June 4, 1957
Serial No. 663,334

Claims priority, application Belgium June 22, 1956

1 Claim. (Cl. 260—18)

The resins obtained according to our copending patent applications Serial No. 628,000, filed December 13, 1956; Serial No. 663,363, filed June 4, 1957, and entitled "Preparation of Resins From Diisocyanates"; and Serial No. 663,364, filed June 4, 1957, and entitled "Process for the Preparation of Resins From Abietyl Alcohols," now U.S. Patent No. 2,867,644; are starting materials for the manufacture of varnishes which resist chemical agents. Experience has shown that these varnishes must be dried in an oven at a temperature of at least 100° C.

The resins of application Ser. No. 663,363 are prepared by heating at least one diisocyanate of the general formula OCN—R—NCO, wherein R is a member selected from the group consisting of aliphatic and aromatic bivalent radicals, with a mixture of at least two monohydroxylated compounds selected from the group consisting of allyl, benzyl, furfuryl and abietyl alcohols, phenol and nonylphenol.

It has now been found that the aforementioned heating necessary to dry varnishes prepared from such resins can be avoided by the use of a suitable catalyst. In this way, resins are obtained which dry in air but which have not always exactly the properties of the resins dried in an oven, that is to say, the resistance thereof, while remaining considerable, may be different. The catalyst is formed by an organometallic compound selected from the group consisting of lead, cobalt, tin and alkyl-tin salts of organic acids and organic esters of titanic, stannic and zirconic acids, or even by a mixture of the aforementioned organometallic compounds.

The quantity of catalyst to be employed is about 3% by weight of the resin, the extreme quantities of the catalyst being 0.5% and 20%.

The organometallic compounds which can be used in the present invention are very numerous. There are more especially to be mentioned:

Lead or cobalt octanoate and 2-ethyl-hexanoate,
Dibutyl-tin dilaurate,
Di-n-octyl-tin monobutyl maleate,
Di-n-octyl-tin bis-(2-ethyl hexanoate),
Di-n-octyl-tin dibutyl thioacetate,
Tetralkyl stannates (alkyl containing from 2 to 8 carbon atoms and more especially tetrabutyl stannate),
Tetralkyl zirconates (alkyl containing from 2 to 8 carbon atoms),
Tetralkyl titanates (alkyl containing from 2 to 8 carbon atoms and more especially tetrabutyl titanate), A series of titanium esters sold by E. I. du Pont de Nemours & Co., such as:

TAT-S-211 (=triethanolamine titanate-N-stearate),
TAT-O-211 (=triethanolamine titanate-N-oleate),
OGT-31 (=octylene glycol titanate),
TAT-21 (=triethanolamine titanate), which are compounds of titanium with triethanolamine or octylene glycol or fatty esters of these compounds. This list is not limitative.

It is necessary to add an ethylenic, acetylenic or abietyl monoalcohol or an alkylated phenol when the monoalcohols or monophenols used for the preparation of the resins do not contain at least one double bond or an alkylated phenyl radical. The quantity of these alcohols which is necessary varies within very wide limits: depending on the resins and the nature of the monoalcohol, 1–40% of the weight of the resin are added.

Example 1

A resin is prepared by heating 168 g. of hexamethylene diisocyanate (commercial product "Desmodur H" of Farbenfabriken Bayer A.G.), 75.2 g. of phenol and 53.2 g. of abietyl alcohols in the form of Abitol to 170° C.

50 g. of this resin are dissolved in 50 g. of toluene. 3 cc. of tetrabutyl titanate are added to this solution. A varnish is obtained which is dust-free in 1 to 2 hours and is resistant to even strong acids (with the exception of hydrochloric acid).

Abitol, sold by Hercules Powder Co., is a mixture of abietyl alcohol and hydroabietyl alcohols in more or less varying proportions.

Example 2

A resin is prepared by heating 168 g. of hexamethylene diisocyanate (Desmodur H) and 266 g. of abietyl alcohols in the form of Abitol at 170° C.

50 g. of this resin are dissolved in 50 g. of toluene. 2 cc. of lead octanoate containing 24% of Pb are added to this solution. A varnish is obtained which is dust-free in 1 to 2 hours and which is resistant even to strong acids.

Example 3

A resin is prepared by heating 168 g. of hexamethylene diisocyanate (Desmodur H), 30 g. of allyl alcohol and 133 g. of abietyl alcohols in the form of Abitol to 170° C.

50 g. of this resin are dissolved in 50 g. of toluene. 2 cc. of lead octanoate containing 24% of Pb are added to this solution. A varnish is obtained which is dust-free in about 2 hours and which resists to even strong concentrated bases, even concentrated sulphuric acid and dilute hydrochloric and nitric acids.

Example 4

A resin is prepared by heating 168 g. of hexamethylene diisocyanate (Desmodur H) and 205 g. of octyl phenol to 170° C. 50 g. of this resin are dissolved in 50 g. of toluene and 3 cc. of triethanolamine titanate-N-stearate (TAT-S-211 of E. I. du Pont de Nemours & Co.) are added to this solution. A varnish is obtained which is dust-free after 3 to 4 hours.

Example 5

A resin is prepared by heating 168 g. of hexamethylene diisocyanate in 60 g. of allyl alcohol to 170° C.

50 g. of the resin obtained are dissolved in 50 g. of toluene and 3 cc. of a 33% solution in toluene of di-n-octyl-tin monobutyl maleate are added. A varnish is obtained which, when spread on a plate, is dust-free in two hours.

Example 6

The toluenic solution of the resin obtained in Example 2 is treated with 12 cc. of a 33% solution in toluene of di-n-octyl-tin bis-(2-ethyl hexanoate). A varnish is obtained which is dust-free in 1 to 2 hours when spread on a plate.

Example 7

The resin solution obtained in Example 3 is treated with 6 cc. of a 33% solution in toluene of di-n-octyl-tin dibutyl thioacetate. A varnish, spread on a plate, is dust-free after 1 to 2 hours.

Example 8

The toluenic solution of the resin obtained in Example 3 is treated with 12 cc. of a 33% solution in toluene of tin-dibutyl dilaurate. A varnish is obtained which, when spread on a plate, is dust-free in two hours.

Example 9

A resin is prepared by heating 168 g. of hexamethylene diisocyanate and 219 g. of nonyl phenol to 170° C. 50 g. of this resin are dissolved in 50 g. of toluene and 4 cc. of lead octanoate containing 24% of Pb are added. A varnish is obtained which is dust-free in 1 to 2 hours when spread on a plate.

Example 10

A resin is prepared by heating 168 g. of hexamethylene diisocyanate and 124 g. of 1-ethynyl cyclohexanol to 170° C.

50 g. of this resin are dissolved in 50 g. of toluene and 3 cc. of tetrabutyl titanate are added. A varnish is obtained which is dust-free in 1 to 2 hours.

Example 11

The toluenic solution of the resin obtained in Example 4 is treated with 2 cc. of cobalt octanoate containing 6% of Co and 2 cc. of OGT-31 (octylene glycol titanate). A varnish is obtained which is dust-free in 2 hours.

Example 12

A resin is prepared by heating 168. g. of hexamethylene diisocyanate, 20 g. of allyl alcohol, 88.6 g. of abietyl alcohols in the form of Abitol and 31.3 g. of phenol at 170° C.

50 g. of resin are dissolved in 50 g. of toluene and the solution is treated with 2 cc. of tetrabutyl titanate and 2 cc. of lead octanoate containing 24% Pb. A varnish is obtained which is dust-free in 1 to 2 hours.

Example 13

Toluenic solution of the resin obtained in Example 4 is treated with 3 cc. of tetrabutyl stannate. A varnish is obtained which is dust-free in 3 to 4 hours.

Example 14

The toluenic solution of the resins obtained in Examples 1 and 4 are treated with 3 cc. of OGT-31 (octylene glycol titanate). Varnishes are obtained which are dust-free in 3 to 4 hours.

Example 15

The toluenic solution of the resin obtained in Example 12 is treated with 3 cc. of 6% "Zirco Drier Catalyst" of Advance Solvents and Chemical Corporation. A varnish is obtained which is dust-free in 1 to 2 hours.

Example 16

The toluenic solution of the resin obtained in Example 4 is treated with 2 cc. of lead octanoate containing 24% of Pb. A varnish is obtained which is dust-free in 1 to 2 hours and which has a good resistance to even concentrated sulphuric acid and to dilute nitric acid.

Example 17

A resin is prepared by heating 134.4 g. of hexamethylene diisocyanate, 59.2 g. of 3,3'-dimethoxy-4,4'-diphenylene diisocyanate (commercial product "Dadi" of The Carwin Co.), and 266 g. of abietyl alcohols in the form of Abitol at 170° C.

50 g. of the resin obtained are dissolved in 50 g. of toluene and 2 cc. of tetrabutyl titanate are added. A varnish is obtained which is dust-free in ½ to 1 hour.

We claim:

An air-drying varnish composition consisting essentially of (1) an organic solution of a resin, said resin being obtained by heating (a) at least one diisocyanate of the general formula OCN—R—NCO wherein R is a member selected from the group consisting of aliphatic and aromatic bivalent radicals with (b) a mixture of at least two monohydroxylated compounds selected from the group consisting of allyl, benzyl, furfuryl, and abietyl alcohols, phenol and nonylphenol and (2) from 0.5 to 20% by weight of a catalytic drier containing tin and selected from the group consisting of tetrabutyl stannate, dibutyl tin dilaurate and di-n-octyl-tin bis-(2-ethyl hexanoate).

References Cited in the file of this patent

UNITED STATES PATENTS

| | | |
|---|---|---|
| 2,374,136 | Rothrock | Apr. 17, 1945 |
| 2,720,468 | Shacklett | Oct. 11, 1955 |
| 2,801,990 | Seeger et al. | Aug. 6, 1957 |

OTHER REFERENCES

Titanium Organics Show Promise, Chem. & Eng. News, pages 4226-8, Oct. 3, 1955.